Figure 1:
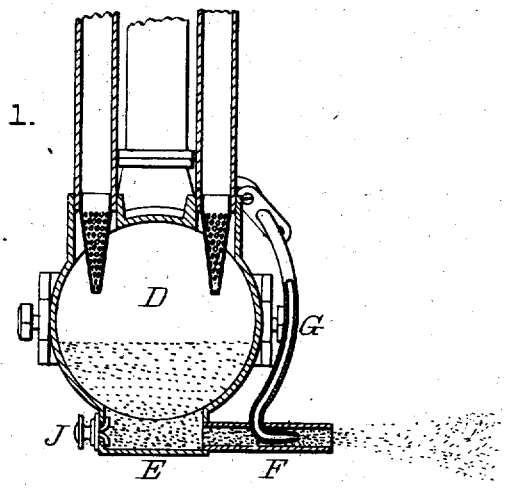

F. M. STEVENS.

Assignor of one-half interest to H. G. Holmes.

SPARK-ARRESTER.

No. 7,811. Reissued July 24, 1877.

Attest
M Gardner
A Scott

Inventor:
Frank M. Stevens,
By J. S. Brown,
asst. attorney

N. PETERS, PHOTO-LITHOGRAPHER, WASHINGTON, D. C.

UNITED STATES PATENT OFFICE.

FRANK M. STEVENS, OF CONCORD, NEW HAMPSHIRE, ASSIGNOR OF ONE-HALF INTEREST TO HENRY G. HOLMES.

IMPROVEMENT IN SPARK-ARRESTERS.

Specification forming part of Letters Patent No. 180,283, dated July 25, 1876; Reissue No. 7,811, dated July 24, 1877; application filed June 6, 1877.

DIVISION B.

*To all whom it may concern:*

Be it known that I, FRANK M. STEVENS, of Concord, in the county of Merrimack and State of New Hampshire, have invented certain new and useful Improvements in Apparatus for Removing Sparks from Spark-Arresters, of which the following is a specification:

My invention relates to that class of spark-arresters in which the sparks, dust, cinders, &c., are deposited in a receiver or chamber, which is cleaned out at intervals, as may be necessary or desirable.

The invention consists in the construction and combination of the various parts which go to make up the complete apparatus herein shown, and which will be hereinafter more fully described.

In the drawings I have shown my invention as applied to an ordinary locomotive-engine, in which—

Figure 2:
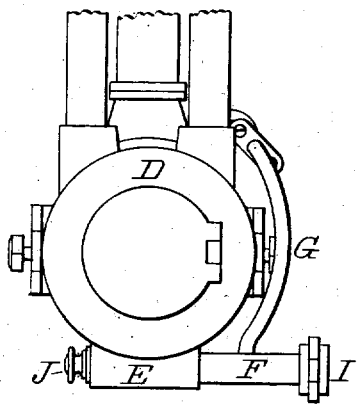
Figure 3:
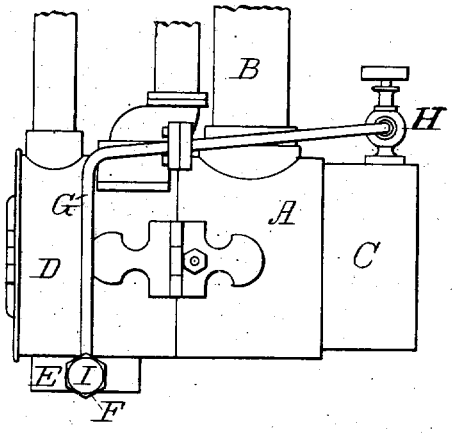

Figure 1 is a transverse section through the the receiver for the sparks. Fig. 2 is a front elevation of the same. Fig. 3 is a side elevation of the same.

Let A represent the smoke box of the engine; B, the chimney; C, the boiler, and D a receiver, into which the sparks are deposited. This receiver is hinged to the front end of the smoke-box, and arranged to cover the same. It is provided with an extension, E, at its lower side or bottom, and out from this leads an exhaust or discharge pipe, F, provided with a cap or cover, I. Into this pipe is led a steam-pipe, G, the same being connected with the boiler of the engine at the other end through the medium of a valve, H. The steam-pipe enters the discharge-pipe, and is bent and arranged in the axis of the same, as shown, pointing outwardly. The pipe G is composed of two pipes or sections, coupled together at the line joining the receiver D to the smoke-box A, the said coupling being of such a character that the two sections may be connected by a close joint, or be readily separated to permit the receiver D to be swung back from over the mouth of the smoke-box.

When the arrester is in ordinary use the cap I is kept screwed onto the extremity of the discharge-pipe; but when deposits of sparks, cinders, &c., have accumulated in the receiver, and its extension to such an extent that cleaning out is desirable or necessary, the said cap is removed, the valve H opened, and the steam discharged into and out of the discharge-pipe, in order to create through and out of the extension a blast sufficient to act upon and expel from it the cinders and sparks.

The discharge-pipe F projects out sidewise, horizontally, and in the wall of the extension, directly opposite, I provide a hand-hole, J, with a suitable cover, whereby access may be had to the discharge-pipe, should it become clogged up, or while the steam-jet is in full operation.

Having thus described my invention, what I claim as new is—

1. The combination of the cylindrical receiver D, hinged to the smoke-box, the extension E, the discharge-pipe F, steam-pipe G, and hand-hole J, all arranged to operate substantially in the manner set forth.

2. The steam-pipe G, in two sections, coupled as described, and connected with a valve, H, in combination with the boiler C, the smoke-box A, and the receiver D, hinged to the latter, and provided with a discharge-pipe, F, all substantially as set forth.

FRANK M. STEVENS.

Witnesses:
SAM. TRO. SMITH,
HENRY CONNETT.